United States Patent [19]
Ohmura et al.

[11] Patent Number: 5,005,487
[45] Date of Patent: Apr. 9, 1991

[54] LINEAR MOTOR DRIVEN CONVEYING APPARATUS

[75] Inventors: Kazumi Ohmura, Tokyo; Jun Nishiyama, Amagasaki; Yukio Chayama, Yawata, all of Japan

[73] Assignee: Tsubakimoto Chain Company, Osaka, Japan

[21] Appl. No.: 491,344

[22] Filed: Mar. 9, 1990

[30] Foreign Application Priority Data

Mar. 17, 1989 [JP] Japan.................................. 65-29796

[51] Int. Cl.⁵ .............................................. B60L 13/00
[52] U.S. Cl. .................................... 104/292; 198/494; 118/70
[58] Field of Search ........................ 104/282, 290, 292; 198/494, 495, 493; 118/70

[56] References Cited

U.S. PATENT DOCUMENTS

| | | | |
|---|---|---|---|
| 2,846,975 | 8/1958 | Hennessey | 198/494 X |
| 3,884,179 | 5/1975 | Szczepanski | 118/70 |
| 4,867,070 | 9/1989 | Mino et al. | 104/282 X |

*Primary Examiner*—Joseph E. Valenza
*Assistant Examiner*—Keith L. Dixon
*Attorney, Agent, or Firm*—Ferrill and Logan

[57] ABSTRACT

A linear motor driven conveyor apparatus is disclosed for conveying trucks carrying articles to be processed through a paint booth or other treatment area having a dirt-laden atmosphere, and a water tank is provided in the treatment area in which the secondary member of the linear motor is immersed to keep its surfaces free of contaminants.

4 Claims, 2 Drawing Sheets

LINEAR MOTOR DRIVEN CONVEYING APPARATUS

FIELD OF THE INVENTION

This invention relates to a linear motor driven conveying apparatus and specifically to improvements in such apparatus for preventing foreign matter, such as paint, dust and the like from entering into clearance gap between primary and secondary members of a linear motor for conveying trucks so that trucks carried by such apparatus may be conveyed smoothly.

BACKGROUND OF THE INVENTION

Conventionally, chain conveyors are used for conveying automotive bodies in their assembly lines, such as, a painting process.

In a chain conveyor, trucks carrying automotive bodies are adapted to be driven by a chain. Paint adhered to the chain is difficult to remove. Also, it is often necessary to stop the conveyor for removing the paint; and a chain conveyor has an inherent limitation with respect to a high speed operation.

For these reasons, recently, linear motor driven conveying apparatus are developed for conveying bodies in painting process, etc., in assembly lines of automotive bodies. Such linear motor driven conveying apparatus are adapted to convey, by means of linear motor, trucks, each of which supports an automotive body. However, since paint can drop on and adheres to the upper surfaces of the primary members of the linear motor and become sandwiched between the primary members and the secondary members mounted to the truck, hindrance to the conveyance is caused.

Also, it is troublesome and time-consuming to remove the paint thus adhered to the primary members.

SUMMARY OF THE INVENTION

The present invention provides a linear motor driven conveying apparatus for conveying trucks by means of linear motor comprising primary members provided on a traveling path of the trucks and secondary members mounted on the trucks, characterized in that a water tank is provided between the primary members and the secondary members such that said secondary members are submerged in said tank.

The trucks are conveyed by the propelling force generated between the primary members and the secondary members. The secondary members are adapted to travel within the tank while imparting a driving force to the trucks.

Thus, paint and other dust in the painting process drop into the tank, and consequently, they do not become sandwiched between the primary and secondary members.

Consequently, the linear motor driven conveying apparatus according to the present invention provides the following advantages:

1. Since the secondary members are submerged into the water tank, and paint or dust, which may drop thereon, are received by the water in the tank, such foreign matter will not become sandwiched between the primary members and the secondary members, thereby keeping the clearance gap between the primary members and the secondary members constant, which contributes to the smooth conveyance of the trucks.

2. Since paint does not adhere onto the primary members, paint removal operation is unnecessary, thereby facilitating maintenance of the conveying apparatus.

3. Since plate-like secondary members are accommodated in the tank, and not the primary members comprising coils, a change to existing systems may be minimal.

EMBODIMENTS

Figure 1:
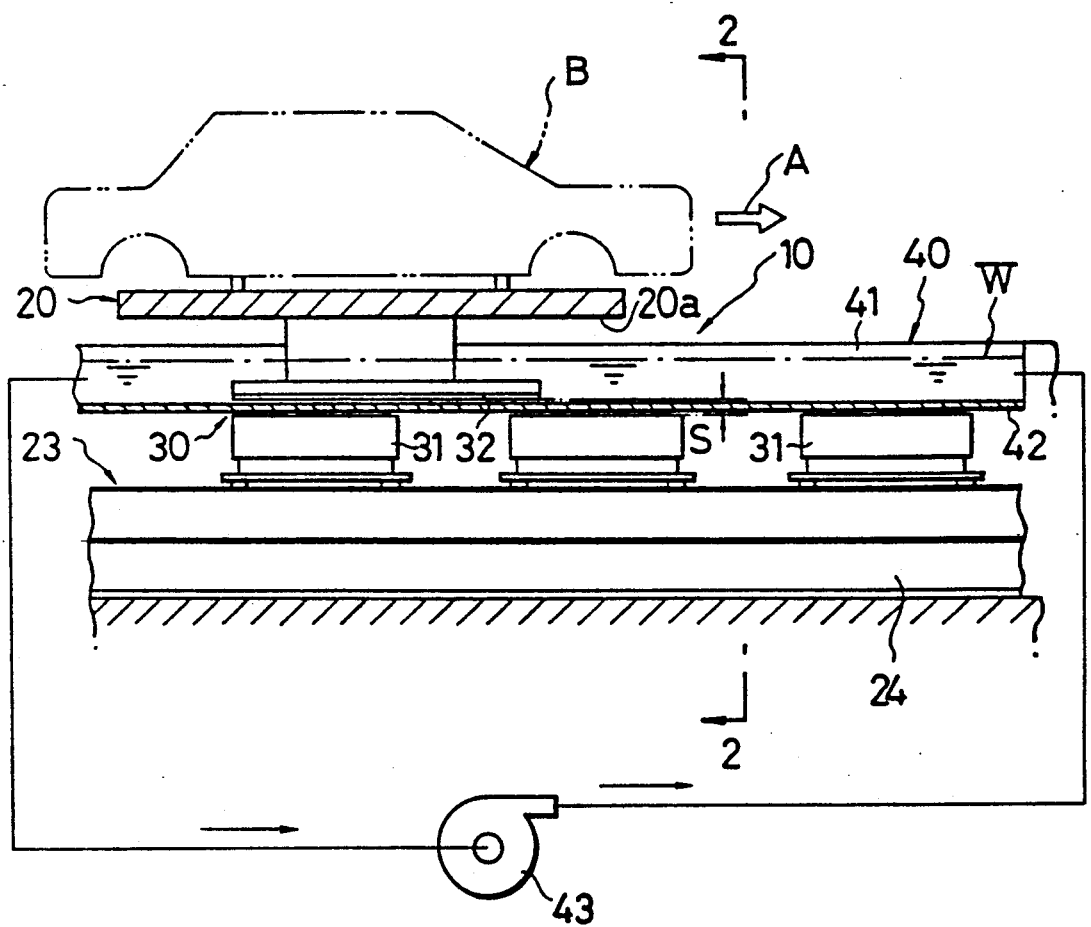
FIG. 1 is a longitudinal section (at line 1—1 of FIG. 2) of an embodiment of the present invention.
Figure 2:
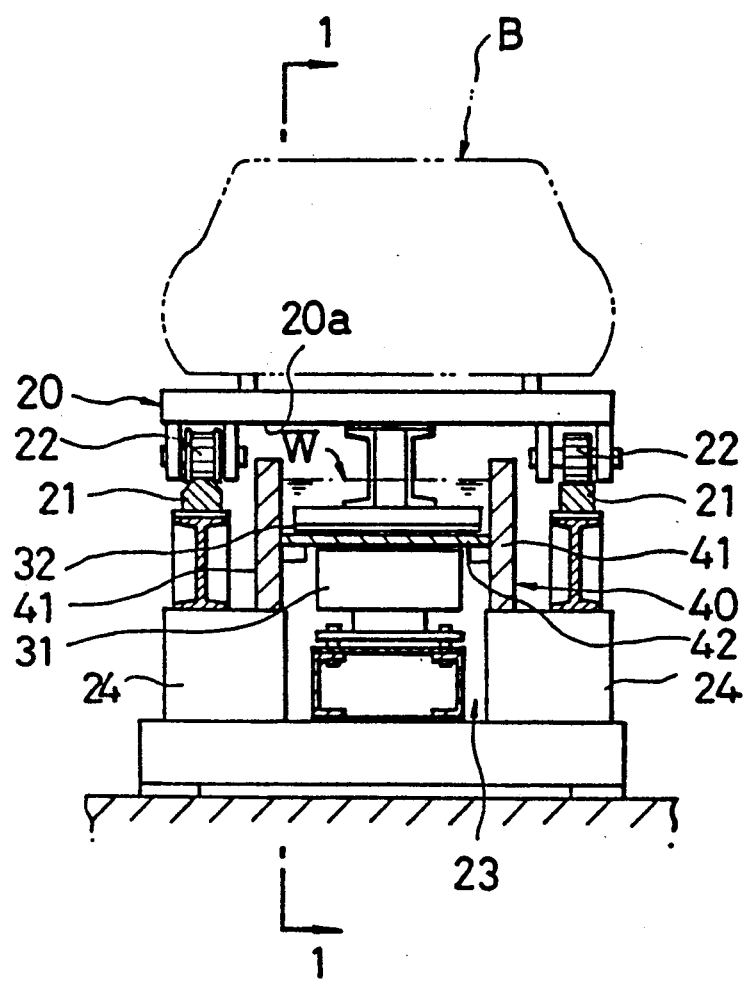
FIG. 2 is a section at line 2—2 of FIG. 1.

With reference to the accompanying drawings, preferred embodiments will be explained hereinbelow.

A linear motor driven conveying apparatus 10 for use in a painting process in assembly lines of automotive bodies mainly comprises trucks 20, linear motor 30 and a water tank 40. The linear motor 30 may be constructed as shown in U.S. Pat. No. 4,867,070, dated Sept. 19, 1989, the disclosure of which is incorporated herein by reference.

The truck 20 is capable of carrying an automotive body B and is provided with four wheels 22 for running on the rails 21, 21.

The linear motor 30 is adapted to serve as a driving source for the trucks 20, and is constructed by primary members 31 provided on the traveling path 23 between the rails 22, 22 and the secondary member 32 mounting on the lower surface 20a of the truck 20. The secondary member 32 is submerged in the water tank 40 as explained later.

The water tank 40 comprises a pair of side walls 41, 41 standing respectively on a pair of frames 24, 24 and a bottom member 42. The bottom member 42 is made of a non-magnetic and non-conductive material, such as, plastics or stainless steel and is adapted to come between the primary members 31 and the secondary member 32.

It is preferable for the water W in the tank 40 to be flowing constantly by means of a pump. To this end, a pump 43 may be provided, pumping water from one end of the tank 40 to the other end. Alternatively, the pump 43 may pump water into one end of the tank 40, with the water leaving the other end of the tank through an overflow pipe, not shown.

Operations will be explained hereinbelow.

The trucks 20, which support the bodies B, are conveyed on the rails 21, 21 by the propelling force generated between the primary members 31 and the secondary members 32 in the direction indicated by arrow A in FIG. 1. During such conveying motion, the bodies B are painted. The truck 20 is adapted to stop at the right-hand end of the water tank 40, where the body B is transferred to the next process by means of a transfer apparatus (not shown). Alternatively, at the respective entrance and exit points of the water tank 40, ramps may be provided so that the trucks 20 may go into and depart from the water tank 40 carrying the bodies B continually.

As mentioned before, since the bottom member 42 is made of a non-magnetic and non-conductive material, no adverse effects will be caused on the magnetic lines to be generated between the primary members 31 and the secondary members 32. Thus, there will be no change to the propelling force imparted by the linear motor 30.

During the painting operation, paint which may drop is received by the water W in the tank 40; and accordingly, it never adheres to the primary members 31 or secondary members 32.

Therefore, since paint is never sandwiched between the primary members 31 and the secondary members 32, the clearance gap S between the primary members 31 and the secondary members 32 may be kept always constant which assures smooth conveyance of the trucks 20; and acceleration or deceleration of the trucks 20 may be effected smoothly.

Although the above-described embodiments pertain to the prevention of paint adhering to the primary members in the painting line, the present invention may also be useful in cases where the linear motor driven conveying apparatus is used in places full of dust. In those cases, since dust may be received by the water tank and never sandwiched between the primary members and the secondary members, trucks may be conveyed smoothly.

Incidentally, it is preferable, as mentioned before, that water W flows within the tank rather than being stationary, because paint and dust may thus be swept away.

What is claimed is:

1. A linear motor driven conveying apparatus for conveying trucks by means of linear motor comprising primary members provided on a traveling path of the trucks and secondary members mounted on the trucks, characterized in that a water tank is provided between the primary members and the secondary members such that said secondary members are submerged in said tank.

2. Apparatus in accordance with claim 1 wherein said water tank includes a substantially horizontal base formed of a nonmagnetic and non-conductive material, said water tank base postioned below said secondary members and above said primary members.

3. Apparatus in accordance with claims 1 or 2 wherein means are provided to cause water to flow longitudinally through said tank in a direction parallel to said secondary member.

4. Apparatus in accordance with claim 3 wherein said secondary member moves in one direction and said water flow is in a direction opposite to that of the movement of said secondary member.

* * * * *